US011230121B2

(12) United States Patent
Chuto (10) Patent No.: US 11,230,121 B2
(45) Date of Patent: Jan. 25, 2022

(54) IMAGE FORMING APPARATUS AND IMAGE FORMING METHOD FOR FORMING IMAGE ON IMAGE FORMING MEDIUM

(71) Applicant: KYOCERA Document Solutions Inc., Osaka (JP)

(72) Inventor: Tatsuya Chuto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 21 days.

(21) Appl. No.: 17/011,532

(22) Filed: Sep. 3, 2020

(65) Prior Publication Data

US 2021/0070069 A1    Mar. 11, 2021

(30) Foreign Application Priority Data

Sep. 10, 2019    (JP) .............................. JP2019-164632

(51) Int. Cl.
*B41J 11/00*    (2006.01)
*B41J 29/19*    (2006.01)

(52) U.S. Cl.
CPC ............ *B41J 11/008* (2013.01); *B41J 11/007* (2013.01); *B41J 11/0065* (2013.01); *B41J 11/0095* (2013.01); *B41J 29/19* (2013.01); *B41J 2203/01* (2020.08)

(58) Field of Classification Search
CPC ..... B41J 11/008; B41J 11/0065; B41J 11/007; B41J 11/0095; B41J 29/19; B41J 2203/01
See application file for complete search history.

(56) References Cited

U.S. PATENT DOCUMENTS

| 2009/0092404 A1* | 4/2009 | Tashiro | B41J 11/008 399/38 |
| 2011/0211006 A1* | 9/2011 | Ochiai | B41J 15/00 347/16 |
| 2013/0257973 A1* | 10/2013 | Tamura | B41J 11/42 347/19 |

FOREIGN PATENT DOCUMENTS

| JP | H09-160731 A | 6/1997 |
| JP | 2006-240068 A | 9/2006 |
| JP | 2007-245626 A | 9/2007 |

* cited by examiner

*Primary Examiner* — Henok D Legesse
(74) *Attorney, Agent, or Firm* — IP Business Solutions, LLC (57) ABSTRACT

An image forming apparatus includes: an image forming device forming an image on an image forming medium based on image data; a medium reading device acquiring, on a conveyance path, medium image data representing the image forming medium; an abnormality detector using the image data to generate contrast image region data for specifying an image formation target region that is a region targeted for image formation, using the medium image data to generate contrast medium region data for specifying an image formation permitted region that is a region on the image forming medium where the image formation is enabled, and detecting, as an abnormal region, the image formation target region present outside of the image formation permitted region or a region corresponding to deficiency present within the image formation permitted region; and an abnormality related information output device using the medium image data to output abnormality related information.

10 Claims, 8 Drawing Sheets

ONE EXAMPLE OF ABNORMALITY
CHECKING IMAGE

Fig.8B

ANOTHER EXAMPLE OF
ABNORMALITY CHECKING IMAGE

IMAGE FORMING APPARATUS AND IMAGE FORMING METHOD FOR FORMING IMAGE ON IMAGE FORMING MEDIUM

INCORPORATION BY REFERENCE

This application claims priority to Japanese Patent Application No. 2019-164632 filed on Sep. 10, 2019, the entire contents of which are incorporated by reference herein.

BACKGROUND

This disclosure relates to an image forming apparatus and an image forming method and more specifically to a technology for managing quality of an image forming medium.

A great deal of printing processing is executed in commercial printing industry, so that abnormality related to a print medium may result in printing undesired by the user in rare cases. There are following technologies that deal with abnormality in print processing. A first technology is for detecting a print size and a position, and minimizing a shift in a coordinate system which determines a position detection system for paper and a position of ink discharge, to thereby perform printing at an appropriate position of the paper. A second technology is for improving accuracy of detecting a recording medium width while improving a print speed, to thereby appropriately reduce an amount of overhanging ink in an image forming apparatus of an ink injection type which performs full surface printing. A third technology is for avoiding, with respect to disagreement between a print size of image data and a size of a print medium, waste of paper by stopping image output, and for making a user to visually check what kind of error is occurring by causing a host computer side to display an error image.

SUMMARY

A technology obtained by further improving the technology described above will be suggested as one aspect of this disclosure.

An image forming apparatus according to one aspect of this disclosure includes an image forming device, a conveyance device, a medium reading device, and a control device. The image forming device discharges ink onto an image forming medium based on image data to form an image. The conveyance device has a conveyance path for conveying the image forming medium to the image forming device. The medium reading device acquires, on the conveyance path, medium image data representing the image forming medium. The control device includes a processor and functioning as an abnormality detector and an abnormality related information output device as a result of executing a control program by the processor. The abnormality detector uses the image data to generate contrast image region data for specifying an image formation target region that is a region targeted for image formation, uses the medium image data to generate contrast medium region data for specifying an image formation permitted region that is a region on the image forming medium where the image formation is enabled, and contrasts the contrast image region data and the contrast medium region data to detect, as an abnormal region, the image formation target region present outside of the image formation permitted region or a region corresponding to deficiency present within the image formation permitted region. The abnormality related information output device uses the medium image data to output abnormality related information that is information related to the abnormal region. The image forming device is capable of limiting discharge of the ink onto the abnormal region.

An image forming method according to another aspect of this disclosure includes image formation, conveyance, medium reading, abnormality detection, and abnormality related information output. The image formation includes forming an image based on image data in an image forming device that discharges ink onto an image forming medium to form an image. The conveyance includes using a conveyance path to convey the image forming medium to the image forming device. The medium reading includes acquiring, on the conveyance path, medium image data representing the image forming medium. The abnormality detection includes using the image data to generate contrast image region data for specifying an image formation target region that is a region targeted for image formation, using the medium image data to generate contrast medium region data for specifying an image formation permitted region that is a region on the image forming medium where image formation is enabled, and contrasting the contrast image region data and the contrast medium region data to detect, as an abnormal region, the image formation target region present outside of the image formation permitted region or a region corresponding to deficiency present within the image formation permitted region. The abnormality related information output includes using the medium image data to output abnormality related information that is information related to the abnormal region. The image formation is capable of limiting discharge of the ink onto the abnormal region.

DETAILED DESCRIPTION

Hereinafter, a mode for carrying out this disclosure (hereinafter referred to as "embodiment") will be described with reference to the drawings.

Figure 1:
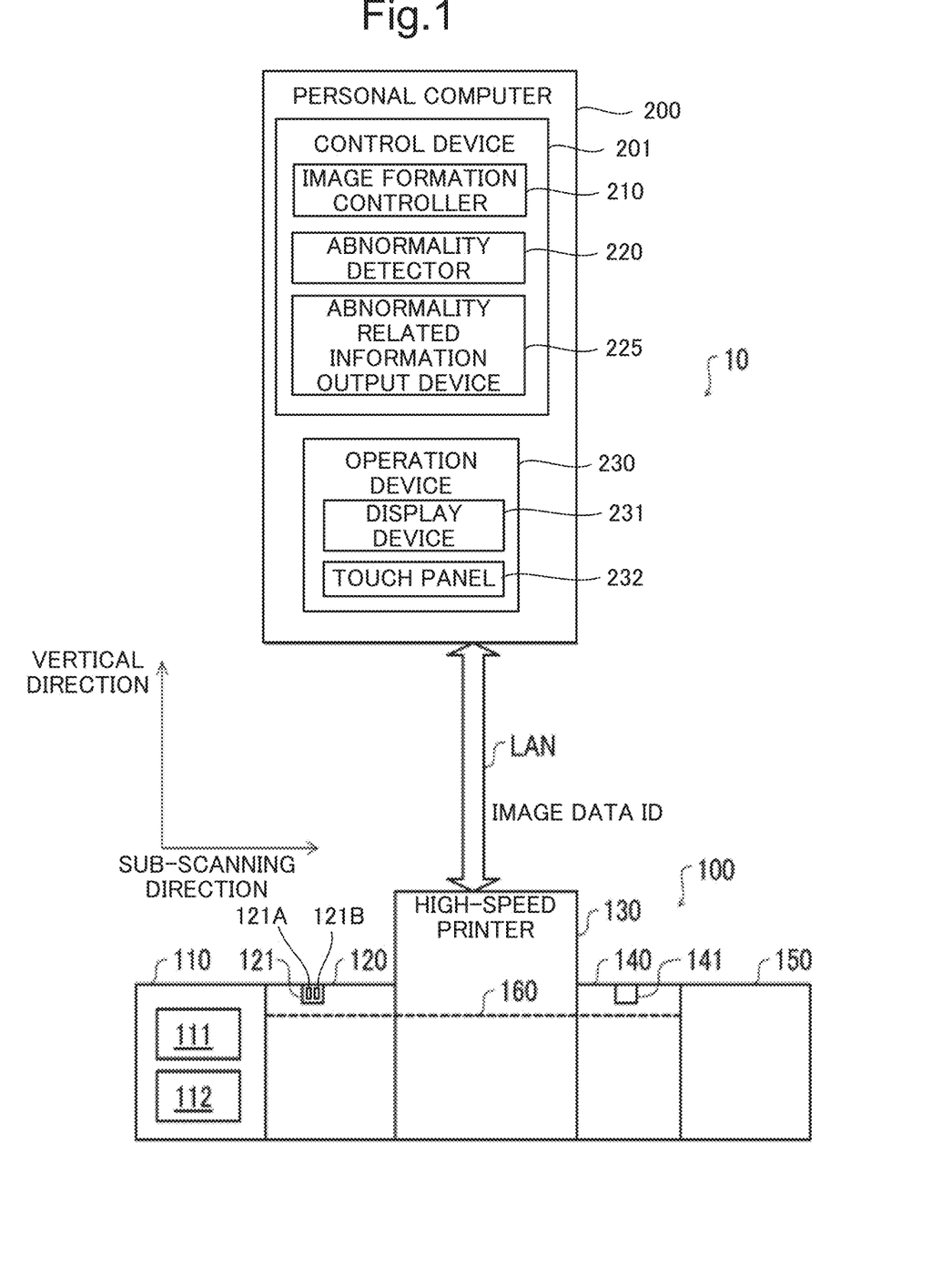
FIG. 1 is a block diagram illustrating functional configuration of a high-speed print system according to one embodiment of this disclosure.

FIG. 1 is a block diagram illustrating functional configuration of a high-speed print system 10 according to one embodiment of this disclosure. The high-speed print system 10 includes a high-speed printer 100 and a personal computer 200. The personal computer 20 and the high-speed printer 100 are connected together via a network, for example, a local area network (LAN). The high-speed printer 100 is also called an image forming apparatus.

The high-speed printer 100 includes a print medium supply device 110, a medium reading device 120, an image forming unit 130, an image reading device 140, a printed material storage device 150, and a medium conveyance belt 160.

The medium conveyance belt 160 sequentially conveys print paper that is supplied from the print medium supply device 110, to the medium reading device 120, the image forming unit 130, the image reading device 140, and the printed material storage device 150 via a conveyance path. The medium conveyance belt 160 is also called a conveyance device. The print paper is also called a print medium or an image forming medium.

The print medium supply device 110 has: for example, a first cassette 111 that stores A4-sized paper; and a second cassette 112 that stores A3-sized paper. Note that the print medium supply device 110 may be configured to store a roll of roll paper (not illustrated) and supply roll paper as a print medium from the roll of roll paper. In this example, the high-speed printer 100 is configured such that an A3 size is a maximum printable width size (a size of the A3-sized paper along a shorter side thereof is a size in a main scanning direction).

The medium reading device 120 has a monochrome line scanner 121 of a CIS type which is arranged on the conveyance path for conveying the print paper to the image forming unit 130. The medium reading device 120 has a light source 121A which irradiates the print paper conveyed on the medium conveyance belt 160 in a sub-scanning direction. The medium reading device 120 uses one CCD line sensor 121B, which is arranged along the main-scanning direction, to generate mask data MD as image data representing a two-dimensional image of the print paper. The mask data MD is also called medium image data and is used in print paper check processing (to be described later on) for detecting abnormality of the print paper.

The image forming unit 130 includes, for example, ink heads respectively for cyan, magenta, yellow, and black (CMYK), and forms ink dots of the CMYK to reproduce a print target image as a print target on the print paper. The image forming unit 130 is also called an image forming device.

The image reading device 140 has a color line scanner of a CIS type which is arranged along the main-scanning direction. The image reading device 140 has: the light source 121A which irradiates a printed material conveyed on the medium conveyance belt 160 in the sub-scanning direction; and three CCD line sensors 121B for RGB which are arranged along the main-scanning direction. The image reading device 140 is used in the printed material quality check processing as processing of checking the quality of the printed material on the print paper on which a desired image has been formed.

The printed material storage device 150 stores the printed material whose quality has been checked through the printed material quality check processing.

The personal computer 200 includes a control device 201 and an operation device 230.

The control device 201 includes a processor, a random access memory (RAM), a read only memory (ROM), and a dedicated hardware circuit. The processor is, for example, a central processing unit (CPU), an application specific integrated circuit (ASIC), or a micro processing unit (MPU).

The control device 201 functions as an image formation controller 210, an abnormality detector 220, and an abnormality related information output device 225 as a result of operation of the aforementioned processor in accordance with a control program stored in, for example, a built-in non-volatile memory. Note that, however, the image formation controller 210, the abnormality detector 220, and the abnormality related information output device 225 can be each formed by a hardware circuit without depending on operation performed in accordance with the control program by the control device 201. Hereinafter, the same applies to each embodiment unless otherwise is specified.

The image formation controller 210 executes color conversion processing or half tone processing on image data to generate dot data for reproducing an image in ink used in the image forming unit 130.

The abnormality detector 220 uses the mask data MD to detect abnormality of the print paper.

The operation device 230 includes hard keys which are operated by a user and a display device 231 as a display device such as a liquid crystal display and includes a touch panel 232 on a front side of a display screen of the display device 231. Thus, the operation device 230 has a touch panel function and displays various menus as an input screen of the display device 231 to receive operation input of the user.

The personal computer 200 has a storage device (not illustrated) composed of, for example, a hard disk drive or a flash memory as a non-transitory recording medium, and stores a control program (including an image formation program) for processing executed by the personal computer 200, data, etc.

Figure 2:
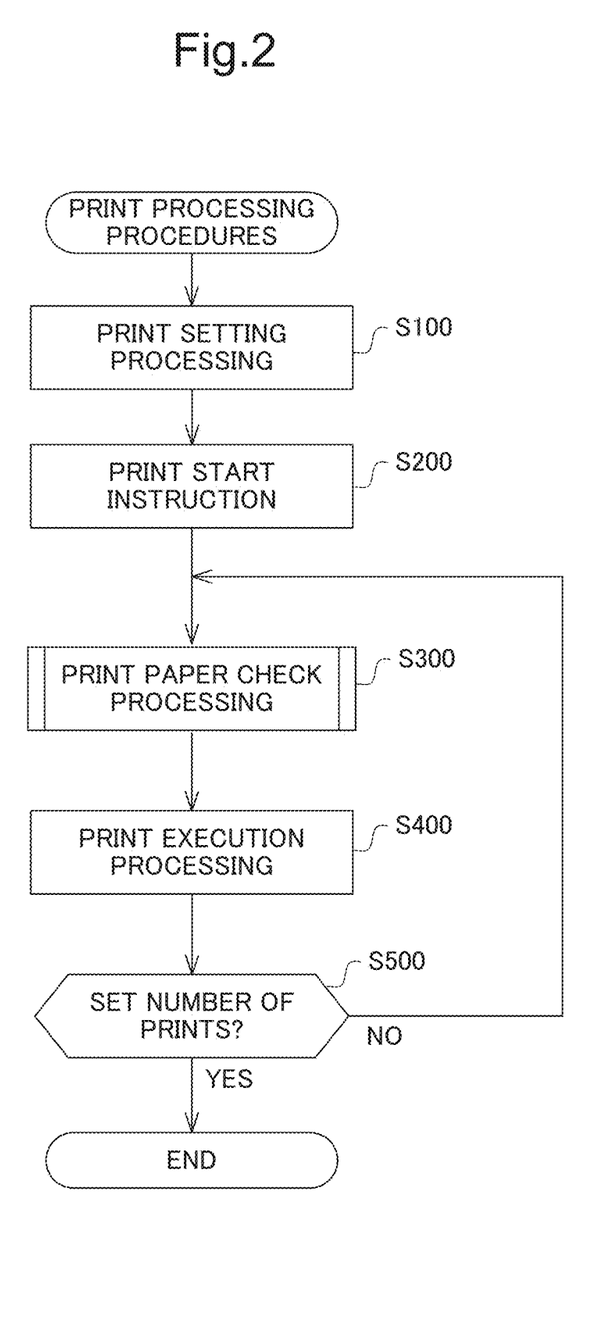
FIG. 2 is a flowchart illustrating details of print processing procedures according to one embodiment.

FIG. 2 is a flowchart illustrating details of print processing procedures according to one embodiment. In step S100, the user executes print setting processing. In the print setting processing, the user checks contents of the image data in the display device 231 of the personal computer 200 and also sets, for example, a method of the half tone processing and the number of prints.

In step S200, the user checks contents of the print setting and provides an instruction for starting printing from the personal computer 200. Consequently, the high-speed print system 10 starts the print processing and proceeds the processing to step S300.

Figure 3:
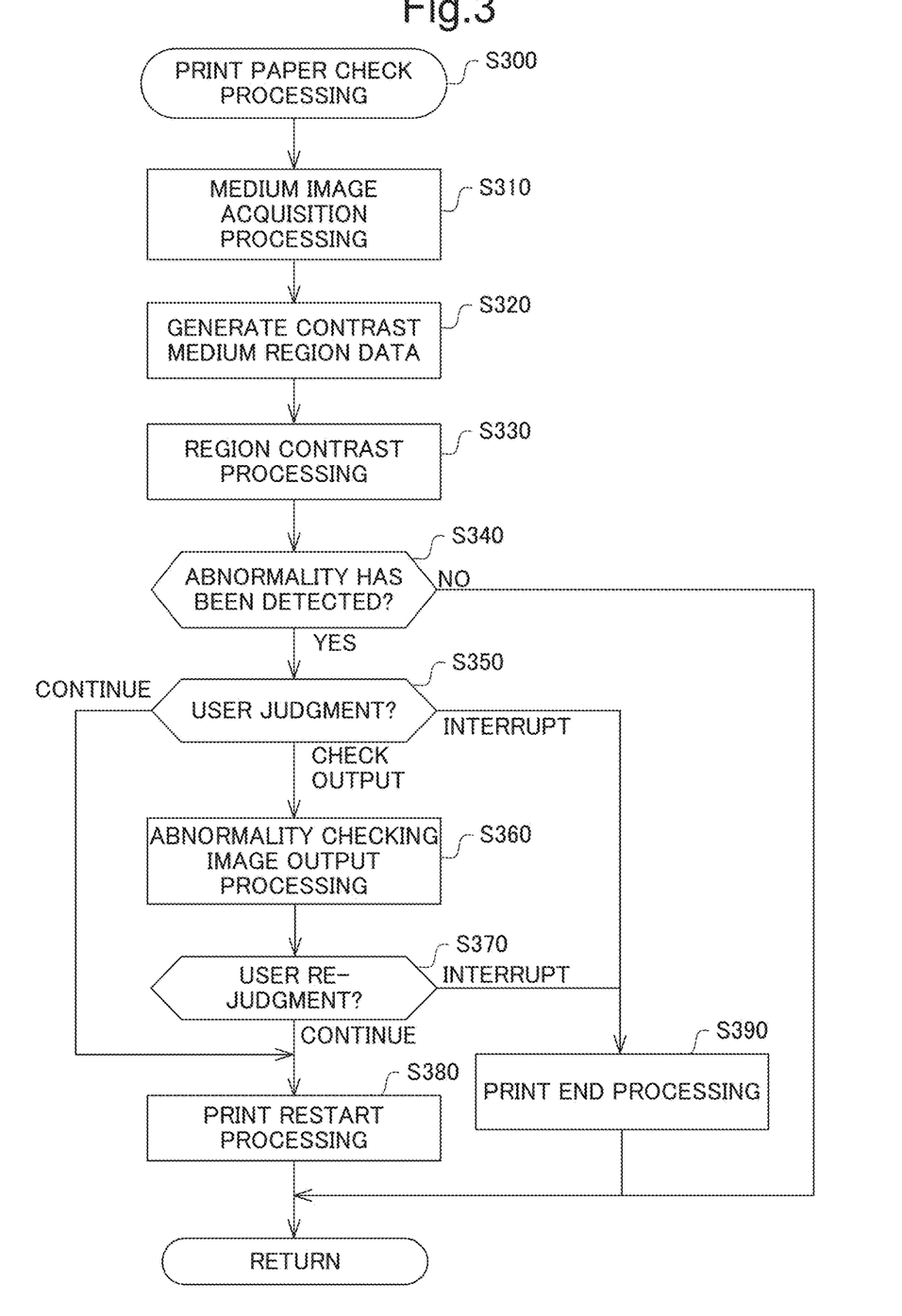
FIG. 3 is a flowchart illustrating details of print paper check processing according to one embodiment.
Figure 4:
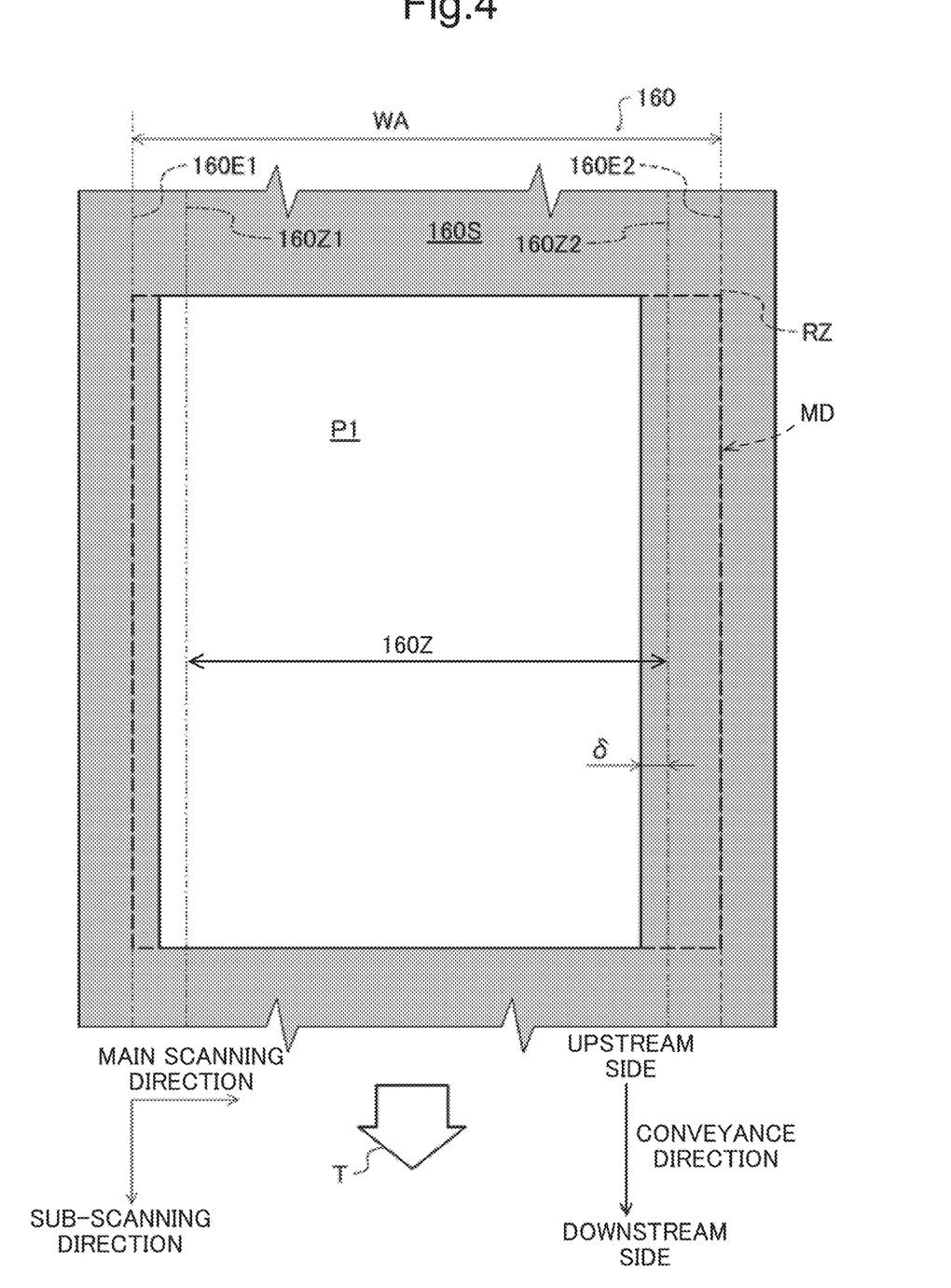
FIG. 4 is an explanatory diagram illustrating a medium conveyance surface of a medium conveyance belt according to one embodiment.

FIG. 3 is a flowchart illustrating details of print paper check processing (step S300) according to one embodiment. FIG. 4 is an explanatory diagram illustrating a medium conveyance surface 160S of the medium conveyance belt 160 according to one embodiment. In this example, the medium conveyance surface 160S conveys print paper P1 of an A3 size, supplied from the print medium supply device 110, in a conveyance direction T and supplies the print paper P1 to the image forming unit 130. The medium conveyance surface 160S has, for example, a gray color, which is a color remarkably different from white.

For the medium conveyance surface 160S, a printable width WA as a maximum printable width in the main scanning direction is set. The printable width WA is set between a first printable end part position 160E1 and a second printable end part position 160E2. The image forming unit 130 is capable of, for example, ink discharge in a range of the printable width WA. For the medium conveyance surface 160S, a print medium region 160Z as a range where the print paper P1 of an A3 size is conveyed is set between the first paper end part position 160Z1 and the second paper end part position 160E2. In this example, the print paper P1 is conveyed on the medium conveyance surface 160S with positional shift δ in the main scanning direction.

In step S310, the medium reading device 120 executes medium image acquisition processing. In the medium image acquisition processing, the print paper P1 is conveyed by the medium conveyance belt 160 (conveyance step) and the medium reading device 120 acquires a conveyed image as an image provided during the conveyance of the print paper P1 to generate mask data MD (medium reading step). The conveyed image is an image of the print paper P1 within an image reading range RZ preset on the medium conveyance surface 160S. The image reading range RZ is set in the same range as the printable width WA.

Figure 5:
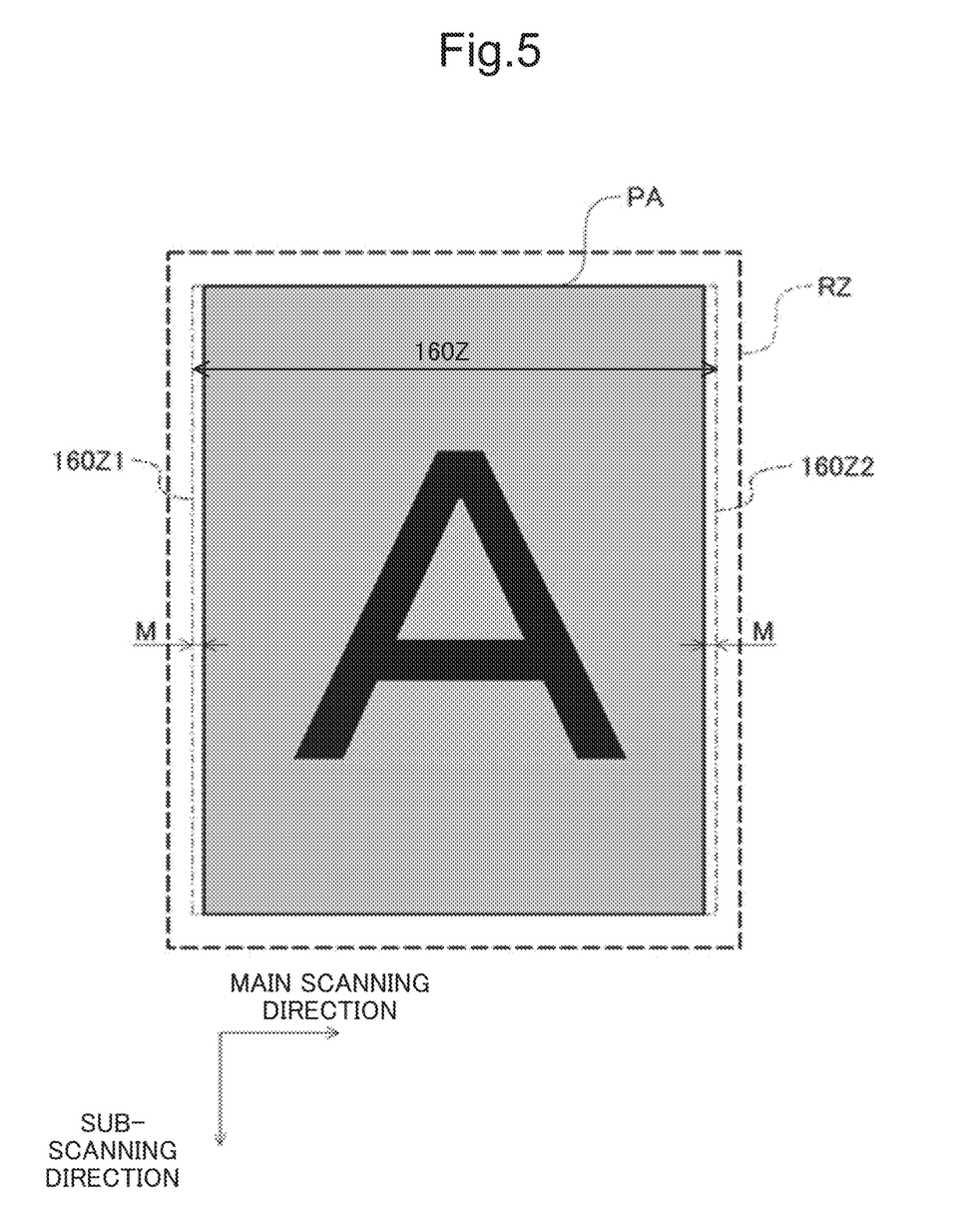
FIG. 5 is an explanatory diagram illustrating relationship between a print medium region and a print target region.

FIG. 5 is an explanatory diagram illustrating relationship between the print medium region 160Z and a print target region PA. The print medium region 160Z (the range between the first paper end part position 160Z1 and the second paper end part position 160Z2) is a region where printing can be performed on the print paper P1. The print target region PA is a region as a target of printing through image formation based on image data ID. The print target region PA is set with a margin M provided at both ends of the print medium region 160Z in the main scanning direction.

The print medium region 160Z and the print target region PA are set with the image reading range RZ as a reference. Consequently, the abnormality detector 220 can judge whether or not an image of the print target region PA is arranged inside the print medium region 160Z.

In step S320, the abnormality detector 220 executes contrast medium region data generation processing. In the contrast medium region data generation processing, the abnormality detector 220 sets a threshold value for identifying a color of the print paper P1 and the gray color of the medium conveyance surface 160S, binarizes the mask data MD with this threshold value, sets a pixel value of a pixel representing the print paper P1 at "0", and sets a pixel value of a pixel representing the medium conveyance surface 160S at "1" to thereby generate contrast medium region data.

Note that the abnormality detector 220 executes the half tone processing on the data ID in parallel to the print setting processing (see step S100 in FIG. 2) to generate dot data representing a state in which dots are formed on the print medium. The abnormality detector 220 sets, at "1", a pixel value of any pixel targeted for image formation based on the dot data, and sets, at "0", a pixel value of any pixel not targeted for the image formation. The abnormality detector 220 maps binary data within the image reading range RZ and previously generates the contrast image region data for specifying the print target region PA.

In step S330, the abnormality detector 220 executes region contrast processing. In the region contrast processing, the abnormality detector 220 subjects the contrast medium region data and the contrast image region data to logical operation. When any pixel having "1" as a logic AND is present, the abnormality detector 220 judges that the print target region PA is present on any pixel outside of the print medium region 160Z.

In step S340 (abnormality detection step), when the print target region PA is present on any pixel outside of the print medium region 160Z, the abnormality detector 220 judges that abnormality is detected and proceeds the processing to step S350, and when no print target region PA is present on the pixel outside of the print medium region 160Z, the abnormality detector 220 judges that abnormality is not detected and proceeds the processing to step S400 (see FIG. 2).

Figure 6:
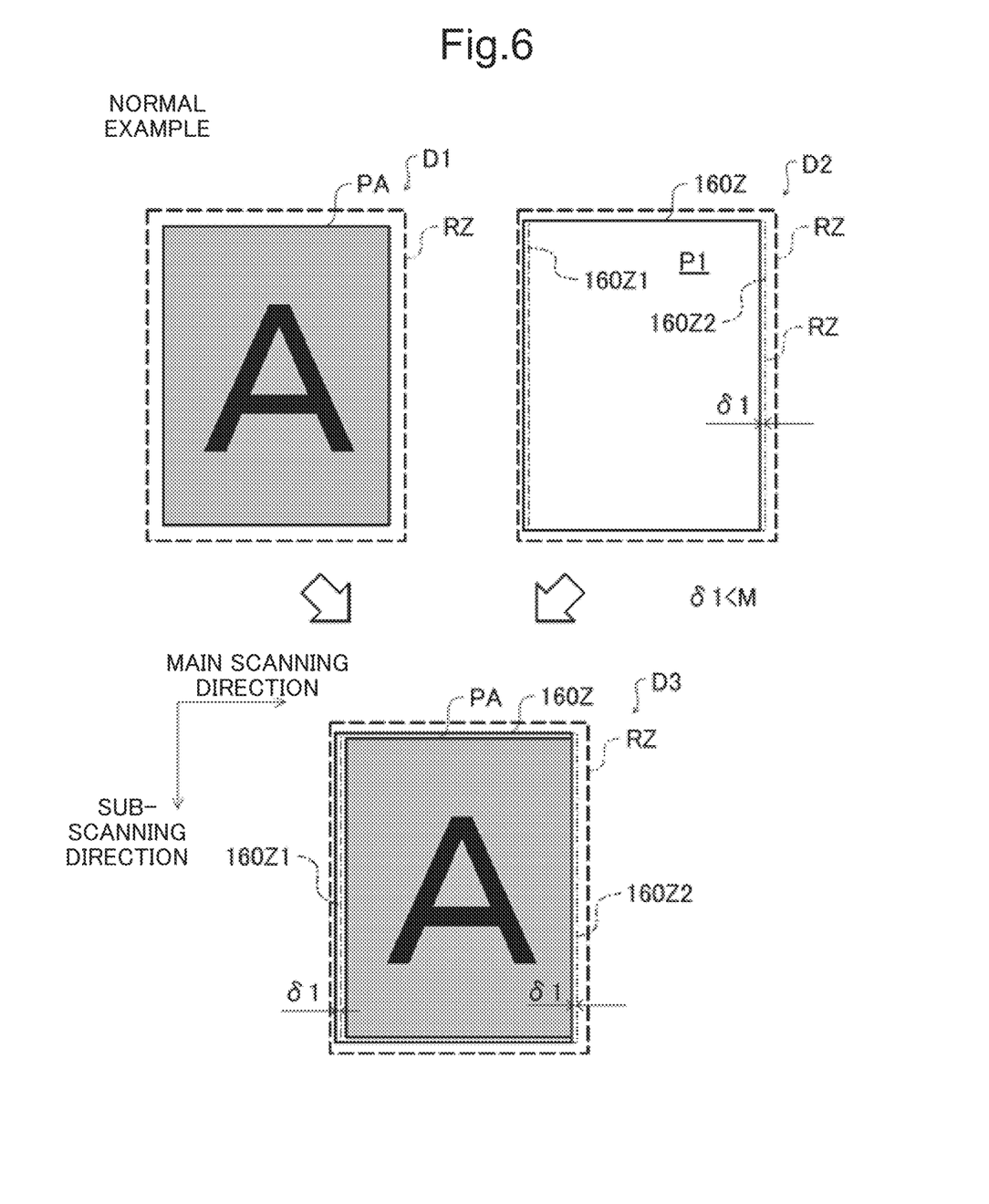
FIG. 6 is an explanatory diagram illustrating one example where conveyance of the print medium is normal.

FIG. 6 is an explanatory diagram illustrating a case where a conveyance state of the print paper P1 is normal. FIG. 6 illustrates contrast image region data D1, contrast medium region data D2, and synthetic data D3 obtained by synthesizing the contrast image region data D1 and the contrast medium region data D2. The contrast medium region data D2 indicates that a shift of the conveyance position of the print paper P1 is occurring leftward in the main scanning direction by a positional shift δ1.

On the other hand, the print target region PA is set with the margin M provided at the both ends of the print medium region 160Z in the main scanning direction. In this example, the positional shift δ1 is equal to or less than the margin M, and thus the print target region PA is not present on any pixel outside of the print medium region 160Z and no pixel having "1" as a logical AND is present. Note that when the positional shift δ1 is greater than the margin M, the abnormality detector 220 detects abnormality. Moreover, when the print target region PA is present on any pixel outside the print medium region 160Z, a region formed by this pixel is also called an abnormal region.

Figure 7:
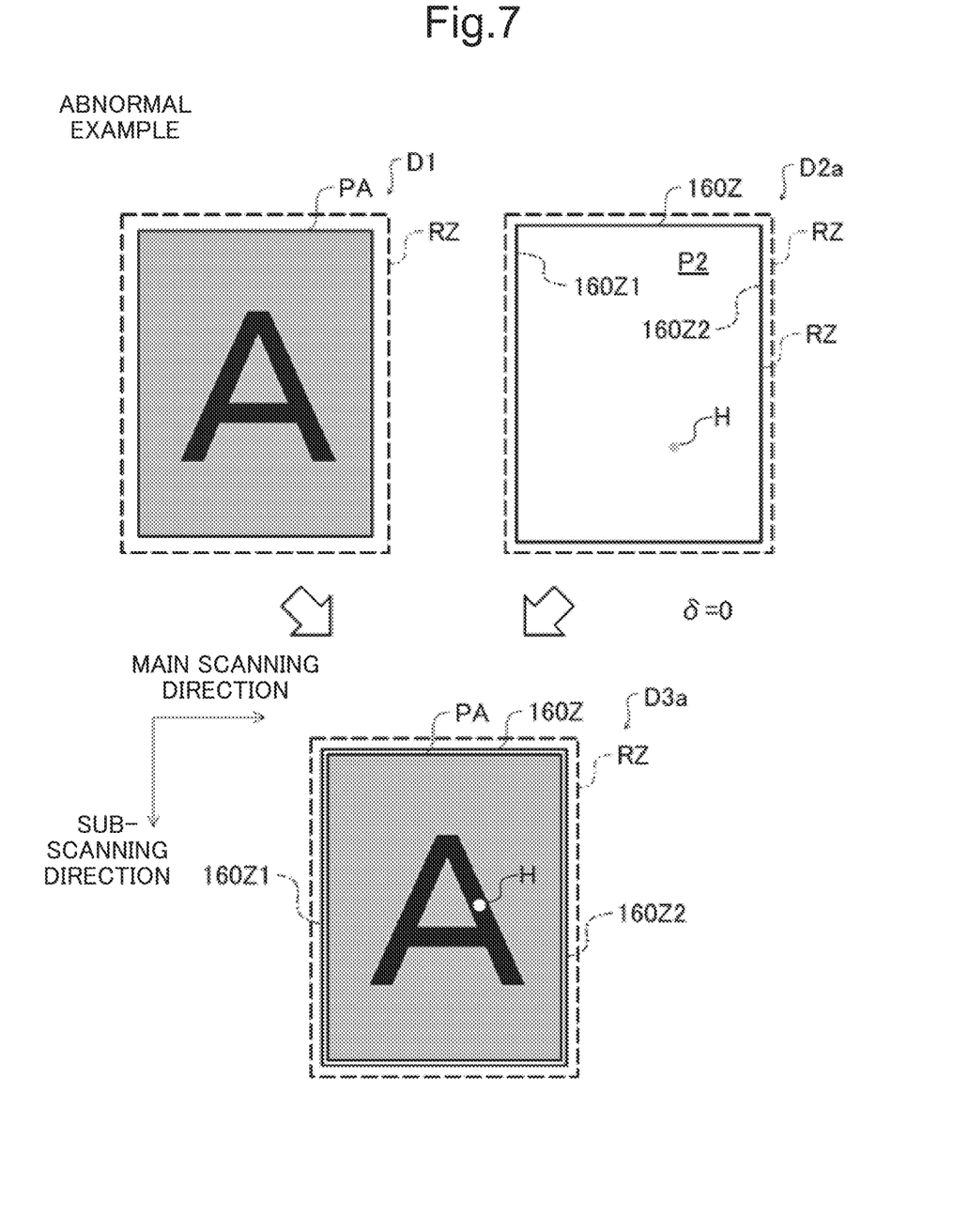
FIG. 7 is an explanatory diagram illustrating one example where a print medium conveyance position is abnormal.

FIG. 7 is an explanatory diagram illustrating one example where the conveyance position of a print medium is abnormal. FIG. 7 illustrates the contrast image region data D1, contrast medium region data D2a, and synthetic data D3a obtained by synthesizing the contrast image region data D1 and the contrast medium region data D2a. The contrast image region data D1 is the same data as the contrast image region data D1 in FIG. 6. The contrast medium region data D2a differs from the contrast medium region data D2 (see FIG. 6) in that no positional shift is occurring and a hole H is formed on print paper P2.

Present in the print medium region 160Z of the contrast medium region data D2a is a region corresponding to the hole H of print paper P2, in other words, an abnormal region that is, a pixel group having "1" as a pixel value of the pixel representing the medium conveyance surface 160S through the hole H. Note that the hole H is illustrated as abnormality of the print medium in this example, but the abnormality is not limited to the hole and, for example, bending or outline missing also contributes to the formation of the abnormal region.

In step S350, the abnormality detector 220 limits ink discharge to the abnormal region and also stops the print processing. The abnormality related information output device 225 causes the display device 231 to display, as abnormality related information, a fact that the abnormality has been detected and a conveyance image representing the print paper P1 when the positional shift δ1 is greater than the margin M or the print paper P2 on which the hole H is present. Consequently, the abnormality related information output device 225 prompts the user to make judgment on action to be taken against the abnormality. The user selects, based on the conveyance image, any of "Continue", "Stop", and "Check output". The abnormality detector 220 restarts the print processing in accordance with the selection of "Continue) (step S380) and ends the print processing in accordance with the selection of "Stop" (step S390).

Regarding the restart of the print processing, it is possible to restart, based on the judgment made by the user, the print processing in a state in which the ink discharge to the abnormal region is limited or it is possible to restart the print processing after releasing the limitation on the ink discharge to the abnormal region. The former is executed, for example, upon judgment that abnormality is within a permitted range in the quality management of a printed material, while the latter is executed, for example, upon erroneous detection. The abnormality detector 220 proceeds the processing to step S360 in accordance with the selection of "Check output".

In step S360 (abnormality related information output step), the abnormality related information output device 225 executes abnormality checking image output processing. In the abnormality checking image output processing, the abnormality related information output device 225 causes the image forming unit 130 to form and output an abnormality checking image on another print paper conveyed following the print paper P1 and P2 on which the abnormality has been detected. The abnormality checking image is one type of the abnormality related information.

Figure 8A:
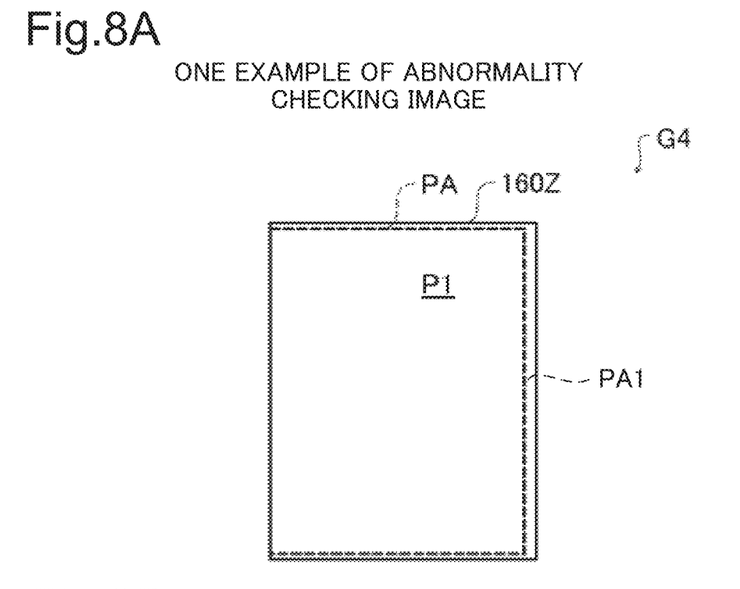
FIGS. 8A and 8B are explanatory diagrams respectively illustrating an abnormality checking image according to one embodiment.
Figure 8B:
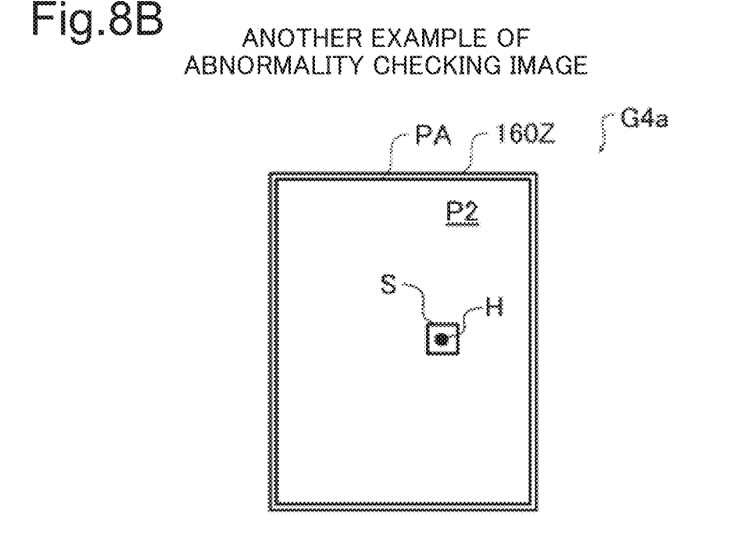

FIGS. 8A and 8B are explanatory diagrams respectively illustrating the abnormality checking image according to one embodiment. FIG. 8A illustrates one example of an abnormality checking image G4 when the positional shift δ is greater than the margin M. Illustrated on the abnormality checking image G4 in this example is an outer outline PA1 illustrating an outline of the print target region PA on the print medium region 160Z. When the positional shift δ is smaller than the margin M, the display device 231 is caused to display an outer outline PA1 on each of a right side and a left side of the print medium region 160Z. However, only the outer outline PA1 on the right side is displayed at the display device 231 and the outer outline PA1 on the left side is not displayed and thus omitted in FIG. 8A. Consequently, the user can check the omission of the outer outline PA1 (the omission of the outer outline PA1 on the left side) and clearly check the presence of the abnormal region.

FIG. 8B illustrates one example of an abnormality checking image G4a when the hole H is formed on the print paper P2. In this example, the image with the hole H is illustrated in ink K (black) with maximum concentration for a better view. The abnormality checking image G4a is an image which is displayed at the display device 231 in a manner such as to be superposed on an image illustrating the print paper P2 together with the image of the hole H where an abnormality specification display S for highlighting and clearly indicating that the hole H (abnormal region) is present within the outline of the print medium region 160Z is defined as a rectangular image surrounding the hole H. Consequently, the abnormality specification display S can properly illustrate a diameter of the hole H even when the diameter of the hole H is extremely small and can also highlight the hole H as the abnormal region to suppress oversight by the user. Furthermore, in the case illustrated in FIG. 4, the abnormality related information output device 225 may be configured to display a rectangular part (protruding to the left of the first paper end part position 160Z1 in the print paper P1) as the abnormality specification display where the rectangular part is shown for example in a hatched form, to thereby highlight the rectangular part as the abnormal region.

As described above, the abnormality detector 220 controls the high-speed printer 100 and the abnormality related information output device 225 forms and outputs, on print paper, an image indicating an abnormal state serving as a basis of the judgement of the abnormality by the abnormality detector 220. Consequently, the user can judge again that printing is continued or interrupted in a state in which a print material indicating a state of the abnormality detection has been acquired (step S370).

In step S400 (image formation step), the image forming unit 130 forms an image on a print medium until the number of prints set in the print setting processing (step S100) reaches a set number of prints and stores a printed material in the printed material storage device 150 (step S500).

As described above, the high-speed print system 10 according to one embodiment can detect, as the abnormal region, an image formation target region present outside of the print medium region 160Z that is an image formation permitted region and can provide the user with the abnormality related information that is information related to the abnormal region by use of medium image data. Consequently, the high-speed print system 10 can support a user who considers taking actions against print failure attributable to the abnormality of the print medium.

The first to third technologies described in BACKGROUND above face a problem that no action can be taken, for example, when defects such as a small hole or paper bending is present on the print medium or against a problem of unexpected positional shift in the main-scanning direction upon conveyance that occurs due to a problem of surface roughness of the print medium in a rare case. Further, improving the detection accuracy for detecting the abnormality of the print medium raises a problem that erroneous detection is likely to occur.

On the contrary, this embodiment can provide a technology for supporting actions taken against image failure attributable to the abnormality of the image forming medium.

This disclosure can be implemented not only in the embodiment described above but also in modified examples as described below.

Modified Example 1

Assumed in the embodiment described above is a case where the print medium has abnormality such as shift or a hole, but this disclosure is not necessarily limited to a case where abnormality is present on a print medium side. This disclosure is also applicable to, for example, a case where the illuminance of the light source 121A is excessive and the gray color of the medium conveyance surface 160S is erroneously recognized due to transmission of thin print paper or a case where there is a problem with setting of a threshold value used for identifying the medium conveyance surface 160S and the print paper.

In such a case, the user can judge that at least one of the illuminance of the light source 121A and the threshold value used for discriminating the image forming medium needs to be adjusted. On the other hand, the medium reading device 120 preferably has an operation mode for using the abnormality related information to adjust at least one of the illuminance of the light source 121A and the threshold value used for discriminating the image forming medium.

More specifically, the medium reading device 120 may have an operation mode for causing the display device 231 to display, in accordance with the illuminance adjustment or the threshold value adjustment, a simulation image whose results of binarization processing of the mask data MD (one example of the abnormality related information) in which the abnormal region has been detected varies in real time. Further, the abnormality related information output device 225 may be configured such that, in a case where the abnormal region has been detected across the full surface of the image reading range RZ of the medium reading device 120 by the abnormality detector 220 or in a case where an abnormal region with the same pattern has been detected regardless of the print medium (for example, in a case where a plurality of abnormal regions with the same pattern have been detected on the print medium), the abnormality related information indicating abnormality of the light source 121A or the CCD line sensor 121B may be presented to the user via the display device 231.

Second Modified Example

In the embodiment described above, the abnormal region appears due to the positional shift of the print paper, but this disclosure assumes an error in the size of the print paper, that is, assumes that the print data is of an A3 size, but even in a case where an image of A4-sized print paper has been read on the conveyance path, the abnormality related information indicating a size difference of the print paper can be presented to the user via the display device 231.

Third Modified Example

In the embodiment described above, the abnormality checking image is formed on another print paper different from the print paper on which the abnormal region has been detected, but an image may be formed which highlights the abnormal region located near the abnormal region of the print paper where the abnormal region has been detected and located inside of the print medium region 160Z (a border part), that is, an image indicating a border between the abnormal region and the image formation permitted region.

Note that the abnormality detector 220 may further function as the abnormality related information output device 225.

Note that, as illustrated in FIG. 1, the high-speed print system 10 includes the high-speed printer 100 and the personal computer 200 in the embodiment described above but this embodiment is not limited thereto. For example, the high-speed printer 100 may include the personal computer 200. Moreover, the high-speed printer 100 may include the control device 201 and the operation device 230.

Moreover, the configuration and the processing of the embodiment described above with reference to FIGS. 1 to 8B merely form one embodiment of this disclosure, and it is not intended to limit this disclosure to the aforementioned configuration and processing.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   an image forming device discharging ink onto an image forming medium based on image data to form an image;
   a conveyance device having a conveyance path for conveying the image forming medium to the image forming device;
   a medium reading device acquiring, on the conveyance path, medium image data representing the image forming medium; and
   a control device including a processor and functioning as an abnormality detector and an abnormality related information output device as a result of executing a control program by the processor, wherein
   the abnormality detector uses the image data to generate contrast image region data for specifying an image formation target region that is a region targeted for image formation, uses the medium image data to generate contrast medium region data for specifying an image formation permitted region that is a region on the image forming medium where the image formation is enabled, and contrasts the contrast image region data and the contrast medium region data to detect, as an abnormal region, the image formation target region present outside of the image formation permitted region or a region corresponding to deficiency present within the image formation permitted region,
   the abnormality related information output device uses the medium image data to output abnormality related information that is information related to the abnormal region, and
   the image forming device is capable of limiting discharge of the ink onto the abnormal region.

2. The image forming apparatus according to claim 1, further comprising
   a display device, wherein
   the abnormality related information output device causes the display device to display, as the abnormality related information, medium image data used for generating the contrast medium region data where the abnormal region is detected.

3. The image forming apparatus according to claim 1, further comprising
   a display device, wherein
   the abnormality related information output device causes the display device to display an abnormality specification display for highlighting the abnormal region detected as the abnormality related information in a manner such as to be superposed on an image representing the image forming medium.

4. The image forming apparatus according to claim 3, wherein
   the abnormality related information output device displays an outline of the image forming medium as the image representing the image forming medium.

5. The image forming apparatus according to claim 1, wherein
   the abnormality related information output device forms, on an image forming medium where the abnormal region is detected, an image indicating a border between the abnormal region and the image formation permitted region.

6. The image forming apparatus according to claim 1, wherein
   the abnormality related information output device causes the image forming device to form an image representing the abnormality related information on another image forming medium different from an image forming medium where the abnormal region is detected and to output the image representing the abnormality related information.

7. The image forming apparatus according to claim 1, wherein
   the medium reading device has a light source and has an operation mode for using the abnormality related information to adjust at least one of illuminance of the light source and a threshold value to be used for discriminating the image forming medium.

8. The image forming apparatus according to claim 1, further comprising
   a display device, wherein
   the medium reading device has a light source and a CCD line sensor, and
   when the abnormal region is detected across a full surface of an image reading range of the medium reading device by the abnormality detector or when a plurality of abnormal regions with a same pattern is detected on the image forming medium by the abnormality detector, the abnormality related information output device causes the display device to display, as the abnormality related information, information indicating abnormality in the light source or the CCD line sensor.

9. The image forming apparatus according to claim 1, wherein
the conveyance device includes a medium conveyance belt having a medium conveyance surface on which the image forming medium is loaded, the medium conveyance surface having a color different from a color of the image forming medium,
the medium reading device acquires, as the medium image data, a conveyance image that is an image of the image forming medium being conveyed on the conveyance path by the medium conveyance belt,
the abnormality detector sets a threshold value for identifying the color of the image forming medium and the color of the medium conveyance surface, binarizes the conveyance image with the threshold value, and sets a pixel value of a pixel displaying the image forming medium at "0" and sets a pixel value of a pixel displaying the medium conveyance surface at "1" to generate the contrast medium region data,
the abnormality detector sets a pixel value of the image formation target region at "1" and sets a pixel value of a region other than the image formation target region at "0" to generate the contrast image region data, and
the abnormality detector performs logical operation on the contrast medium region data and the contrast image region data, and when any pixel has a logical AND "1", judges that a pixel located outside of the image formation permitted region has the image formation target region.

10. An image forming method comprising:
image formation, including forming an image based on image data in an image forming device that discharges ink onto an image forming medium to form an image;
conveyance, including using a conveyance path to convey the image forming medium to the image forming device;
medium reading, including acquiring, on the conveyance path, medium image data representing the image forming medium;
abnormality detection, including using the image data to generate contrast image region data for specifying an image formation target region that is a region targeted for image formation, using the medium image data to generate contrast medium region data for specifying an image formation permitted region that is a region on the image forming medium where image formation is enabled, and contrasting the contrast image region data and the contrast medium region data to detect, as an abnormal region, the image formation target region present outside of the image formation permitted region or a region corresponding to deficiency present within the image formation permitted region; and
abnormality related information output, including using the medium image data to output abnormality related information that is information related to the abnormal region, wherein
the image formation is capable of limiting discharge of the ink onto the abnormal region.

* * * * *